US009718018B2

(12) United States Patent
Haynam et al.

(10) Patent No.: US 9,718,018 B2
(45) Date of Patent: *Aug. 1, 2017

(54) FILTER CLEANING SYSTEM AND METHOD

(71) Applicants: Travis Haynam, Maineville, OH (US); Matt Stehlin, Cincinnati, OH (US); Cathy Haglund, Cincinnati, OH (US)

(72) Inventors: Travis Haynam, Maineville, OH (US); Matt Stehlin, Cincinnati, OH (US); Cathy Haglund, Cincinnati, OH (US)

(73) Assignee: United Air Specialists, Inc., Cincinnati, OH (US)

( * ) Notice: Subject to any disclaimer, the term of this patent is extended or adjusted under 35 U.S.C. 154(b) by 337 days.

This patent is subject to a terminal disclaimer.

(21) Appl. No.: 14/286,512

(22) Filed: May 23, 2014

(65) Prior Publication Data

US 2014/0251384 A1 Sep. 11, 2014

Related U.S. Application Data

(63) Continuation of application No. 13/388,374, filed as application No. PCT/US2010/043087 on Jul. 23, 2010, now Pat. No. 8,864,913.

(60) Provisional application No. 61/230,849, filed on Aug. 3, 2009.

(51) Int. Cl.
| | |
|---|---|
| *B01D 46/00* | (2006.01) |
| *B08B 5/02* | (2006.01) |
| *B01D 46/24* | (2006.01) |

(52) U.S. Cl.
CPC ...... *B01D 46/0068* (2013.01); *B01D 46/2411* (2013.01); *B08B 5/023* (2013.01)

(58) Field of Classification Search
CPC ............ B01D 46/0069; B01D 46/0072; B01D 46/0073; B01D 2201/08; B01D 2201/081
See application file for complete search history.

(56) References Cited

U.S. PATENT DOCUMENTS

| | | | |
|---|---|---|---|
| 2,409,078 A | 10/1946 | Swann | |
| 3,683,595 A | 8/1972 | Houghton et al. | |
| 3,874,857 A | 4/1975 | Hunt et al. | |
| 4,007,026 A | 2/1977 | Groh | |
| 4,058,379 A * | 11/1977 | Cheng ................ | B01D 46/0068 55/302 |
| 4,157,899 A | 6/1979 | Wheaton | |
| 4,204,846 A | 5/1980 | Brenholt | |
| 4,209,311 A | 6/1980 | Deeg et al. | |
| 4,211,543 A | 7/1980 | Tokar et al. | |
| 4,253,856 A | 3/1981 | Paucha | |
| 4,304,580 A | 12/1981 | Gehl et al. | |

(Continued)

FOREIGN PATENT DOCUMENTS

| | | |
|---|---|---|
| CN | 101264406 A | 9/2008 |
| EP | 0329659 A1 | 8/1989 |

(Continued)

*Primary Examiner* — Nicole Blan
(74) *Attorney, Agent, or Firm* — Reinhart Boerner Van Deuren P.C.

(57) ABSTRACT

A filter cleaning system for cleaning a filter element is provided. The filter cleaning system includes a set of pulse nozzles and a compressed air supply, which rotate together during a cleaning cycle to release pulse blasts at predetermined time intervals to clean the filter element.

39 Claims, 10 Drawing Sheets

(56) References Cited

U.S. PATENT DOCUMENTS

| | | | |
|---|---|---|---|
| 4,353,722 A * | 10/1982 | Berz | B01D 46/0058 55/294 |
| 4,482,366 A | 11/1984 | Camplin et al. | |
| 4,578,092 A | 3/1986 | Klimczak | |
| 4,629,482 A | 12/1986 | Davis | |
| 4,759,783 A | 7/1988 | Machado | |
| 4,765,811 A | 8/1988 | Beckon | |
| 4,789,387 A | 12/1988 | Nemesi et al. | |
| 4,808,234 A * | 2/1989 | McKay | B01D 41/04 134/144 |
| 5,002,594 A | 3/1991 | Merritt | |
| 5,145,496 A | 9/1992 | Mellen | |
| 5,295,602 A | 3/1994 | Swanson | |
| 5,562,746 A | 10/1996 | Raether | |
| 5,565,012 A | 10/1996 | Buodd | |
| 5,616,171 A | 4/1997 | Barris et al. | |
| 6,022,388 A | 2/2000 | Andersson et al. | |
| 6,036,757 A | 3/2000 | Gatchell et al. | |
| 6,090,173 A | 7/2000 | Johnson et al. | |
| 6,093,237 A | 7/2000 | Keller et al. | |
| 6,129,852 A | 10/2000 | Elliott et al. | |
| 6,149,716 A | 11/2000 | Bach et al. | |
| 6,235,194 B1 | 5/2001 | Jousset | |
| 6,302,931 B1 | 10/2001 | Min | |
| 6,309,447 B1 | 10/2001 | Felix | |
| 6,332,902 B1 | 12/2001 | Simonsen et al. | |
| 6,364,921 B1 | 4/2002 | Raether et al. | |
| 6,432,153 B1 | 8/2002 | Richard | |
| 6,676,721 B1 | 1/2004 | Gillingham et al. | |
| 6,902,592 B2 | 6/2005 | Green et al. | |
| 7,419,532 B2 * | 9/2008 | Sellers | B01D 46/0064 95/19 |
| 2001/0000845 A1 | 5/2001 | Coulonvaux | |
| 2003/0182906 A1 | 10/2003 | Chullanandana et al. | |
| 2003/0226800 A1 | 12/2003 | Brown et al. | |
| 2006/0225389 A1 | 10/2006 | Scott et al. | |
| 2008/0083333 A1 * | 4/2008 | Yokoi | B01D 46/0056 95/277 |
| 2009/0151572 A1 | 6/2009 | Ferguson et al. | |
| 2009/0294139 A1 | 12/2009 | Wilson | |
| 2010/0083987 A1 * | 4/2010 | Reining | B01D 46/0068 134/22.12 |
| 2010/0263344 A1 | 10/2010 | Haynam et al. | |
| 2010/0269461 A1 | 10/2010 | Haynam et al. | |

FOREIGN PATENT DOCUMENTS

| | | |
|---|---|---|
| JP | 06-154531 A | 6/1994 |
| WO | WO 99/37386 A1 | 7/1999 |
| WO | WO 2004/103527 A1 | 12/2004 |
| WO | WO 2005/068051 A1 | 7/2005 |
| WO | WO 2009/061983 A1 | 5/2009 |
| WO | WO 2009/061998 A1 | 5/2009 |

* cited by examiner

FILTER CLEANING SYSTEM AND METHOD

CROSS-REFERENCE TO RELATED PATENT APPLICATIONS

This patent application is a continuation of co-pending U.S. patent application Ser. No. 13/388,374, filed Feb. 1, 2012, which is a 371 national stage entry of PCT Patent Application No. PCT/US2010/043087, filed Jul. 23, 2010 and which designated the United States. This patent application claims the benefit of U.S. Provisional Patent Application No. 61/230,849, filed Aug. 3, 2009, the entire teachings and disclosures of which are incorporated herein by reference thereto.

FIELD OF THE INVENTION

This invention generally relates a system and method of cleaning filters and more particularly relates to a cleaning system using pressurized air.

BACKGROUND OF THE INVENTION

Filters are generally used for filtering particulate matters in fluid streams. As a particulate laden fluid stream flows through a filter, the particulates accumulate on and/or within the filters. The particulates build up and block pores of the filter, which restricts the fluid flow through the filter. When the fluid flow through the filter is significantly restricted by the particulate build-up, the filter must be cleaned or replaced. To extend a life of the filter, cleaning systems have been developed to clean the particulate build up by applying a jet of pressurized air in the reverse fluid flow direction. Such prior art includes Apparatus and Method for Cleaning an Air Filter Unit, U.S. Pat. No. 6,902,592 to Green et al. assigned to the present assignee, the entire disclosure of which are incorporated herein by reference thereto.

The present invention relates to improvements over prior filter cleaning systems.

BRIEF SUMMARY OF THE INVENTION

In one aspect, the invention provides a filter cleaning system for cleaning a filter element. The filter cleaning system includes a compressed air manifold, at least one pulse nozzle operatively attached to the compressed air manifold, and a rotating plate assembly. The compressed air manifold and the set of pulse nozzles are mounted to the rotating plate assembly. The rotating plate assembly rotates during a cleaning cycle.

In another aspect, the invention provides a method of cleaning a filter element with a filter cleaning system. The filter cleaning system includes a compressed air manifold, at least on pulse nozzle operatively attached to the compressed air manifold, and a rotating plate assembly, wherein the compressed air manifold and the set of pulse nozzles are mounted to the rotating plate assembly. The method of cleaning a filter element includes steps of placing a filter element around the filter cleaning system, rotating the rotating plate assembly during a cleaning cycle, and releasing at least one pulse of pressurized air from the at least one pulse nozzle during the cleaning cycle at controlled locations.

In yet another aspect, the invention provides a method of cleaning a cylindrical filter element with a filter cleaning system positioned within a central cavity of the filter element. The method includes steps of rotating the filter cleaning system about a central axis of the filter element, releasing a plurality of pulses of pressurized air from the filter cleaning system in an organized sequence of a first cleaning cycle.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
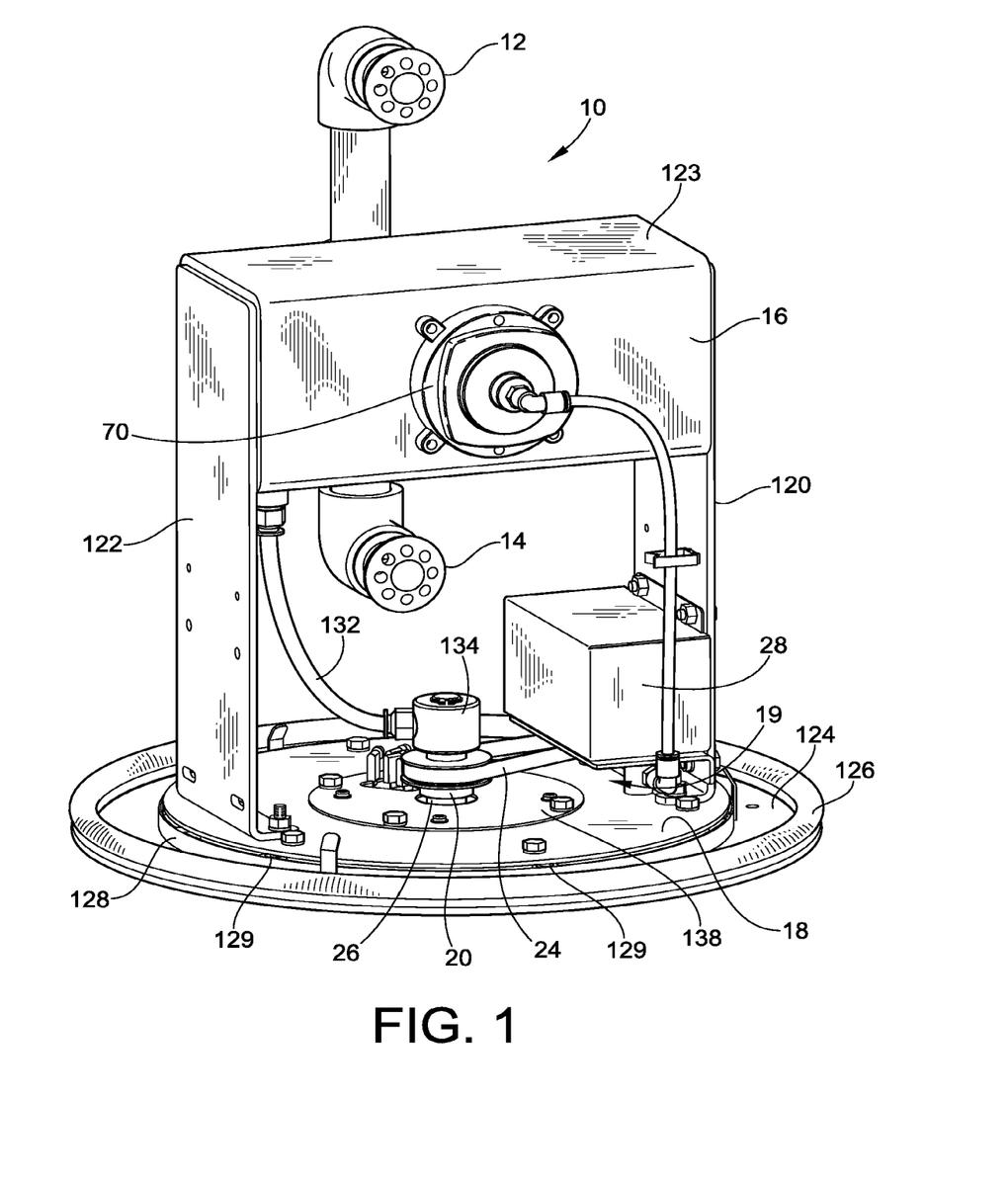
FIG. 1 is a perspective angular view of a filter cleaning system according to an embodiment of the present invention.
Figure 2:
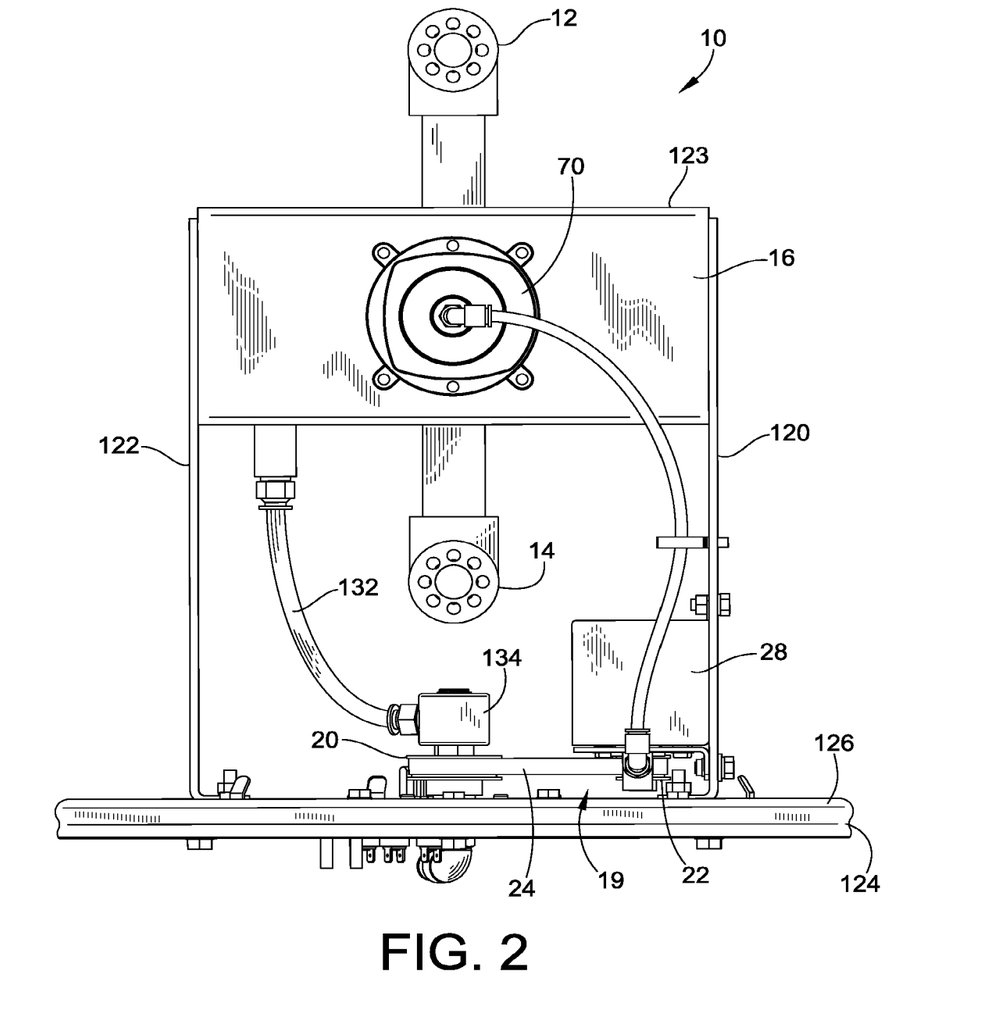
FIG. 2 is a perspective front view of the filter cleaning system of FIG. 1.

FIGS. 1 and 2 show a filter cleaning system 10 for cleaning dust loaded air filter elements using pressurized air pulses according to an embodiment of the present invention. Although this embodiment is described as a filter cleaning system for air filter elements, the filter cleaning system can also be used to clean other fluid filtration filter elements. The filter cleaning system of the present invention can shorten a duration of a cleaning cycle and provide a fuller cleaning coverage over prior cleaning systems, while using less compressed air and energy.

Figure 3:
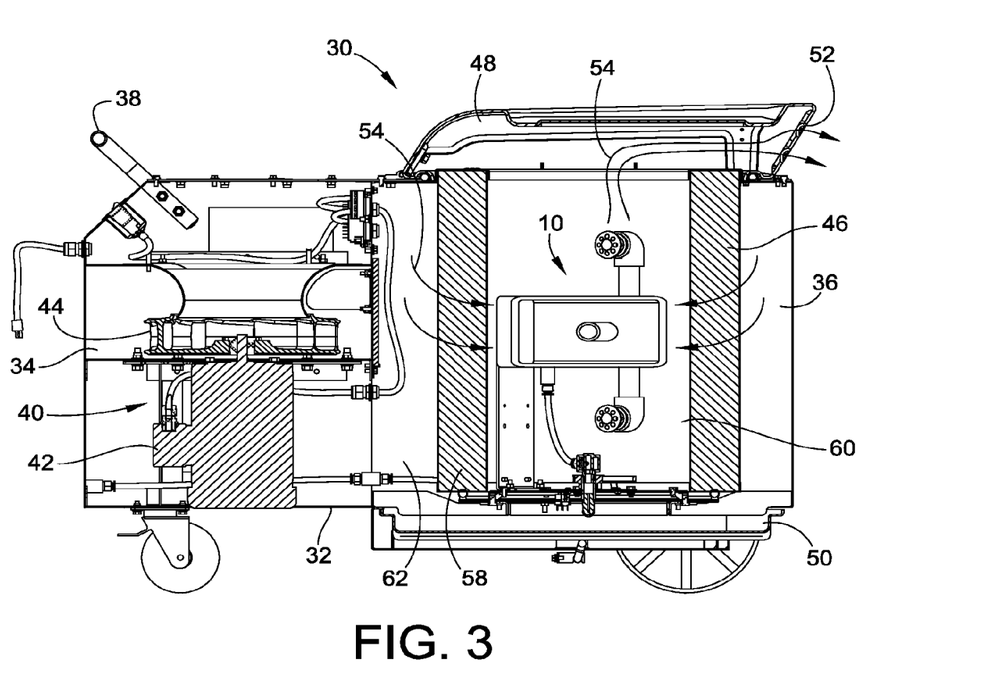
FIG. 3 is a cross sectional view of a portable air cleaner assembly according to an embodiment of the present invention with the filter cleaning system of FIG. 1.

As shown in FIGS. 1-2, the filter cleaning system 10 generally includes a set of pulse nozzles 12, 14 and a compressed air manifold 16, which are mounted on a rotatable turntable 18, which is driven by a drive mechanism including pulleys 20, 22, a timing belt 28, and a motor 28. Although the set of pulse nozzles includes two pulse nozzles in this embodiment, the set of pulse nozzles can include one pulse nozzle or more than two pulse nozzles in other embodiments. FIG. 3 shows a cross sectional view of the filter cleaning system 10 in a portable air cleaner system 30 according an embodiment of the present invention. Such portable air cleaner systems are disclosed in PCT. Pat. Application Nos. PCT/US2008/082727 to Haynam et al. and PCT/US2008/082747 to Haynam et al. assigned to the present assignee, the entire disclosure of which are incorporated herein by reference thereto. Although the filter cleaning system 10 is described and illustrated as being installed in a portable cleaning system 30 in this embodiment, the filter cleaning system 10 may be a stand alone unit or a part of various other filtration systems in other embodiments.

The portable air cleaner system 30 shown in FIG. 3 generally includes a filter housing 32 comprising an air intake region 34 and a dust collection region 36. The air intake region 34 includes an air inlet 38 for receiving a particulate laden air stream and a blower 40 comprising an electrical motor 42 and an impeller 44 that is operative to draw the air in through the air inlet 38 and into the dust collection region 36. The dust collection region 36 includes a filter element 46, which is accessible via an access hatch 48, the filter cleaning system 10, a dust collection tray 50, and an air outlet 52 located in the access hatch 48 for directing the filtered air out through a selected side of the portable air cleaner system 30. The dust laden dirty air drawn from the exterior of the portable air cleaner system 30 through the air intake region 34 passes through the filter element 46, wherein particulate matter is filtered by the filter media 58, and the filtered air exits through the air outlet 52, as shown by a air flow direction 54.

As the particle laden air passes through the filter element 46, particles accumulate on the filter media 58, wherein particles block pores of a filter media, thereby restricting the air flow through the filter element 46. When the air flow is significantly restricted and a pressure drop across the filter element 46 increases substantially, the filter element 46 must be replaced or cleaned for further operation of the air cleaner system.

In this embodiment, the portable air cleaner system 30 includes a filter element monitor (not shown), which monitors a pressure drop across the filter element 46. When the pressure drop across the filter element 46 reaches a preset level, an indicator on a control panel (not shown) of the portable air cleaner system 30 lights up to instruct a user to press a button to manually start a cleaning cycle. Other embodiments may include other type of indicating devices, for example, a dial indicator or a gauge, to alert the user. Although the cleaning cycle is manually started by the user in this embodiment, the cleaning cycle may be programmed to run automatically upon the filter element monitor detecting the preset level of the pressure drop in other embodiments.

Figure 4:
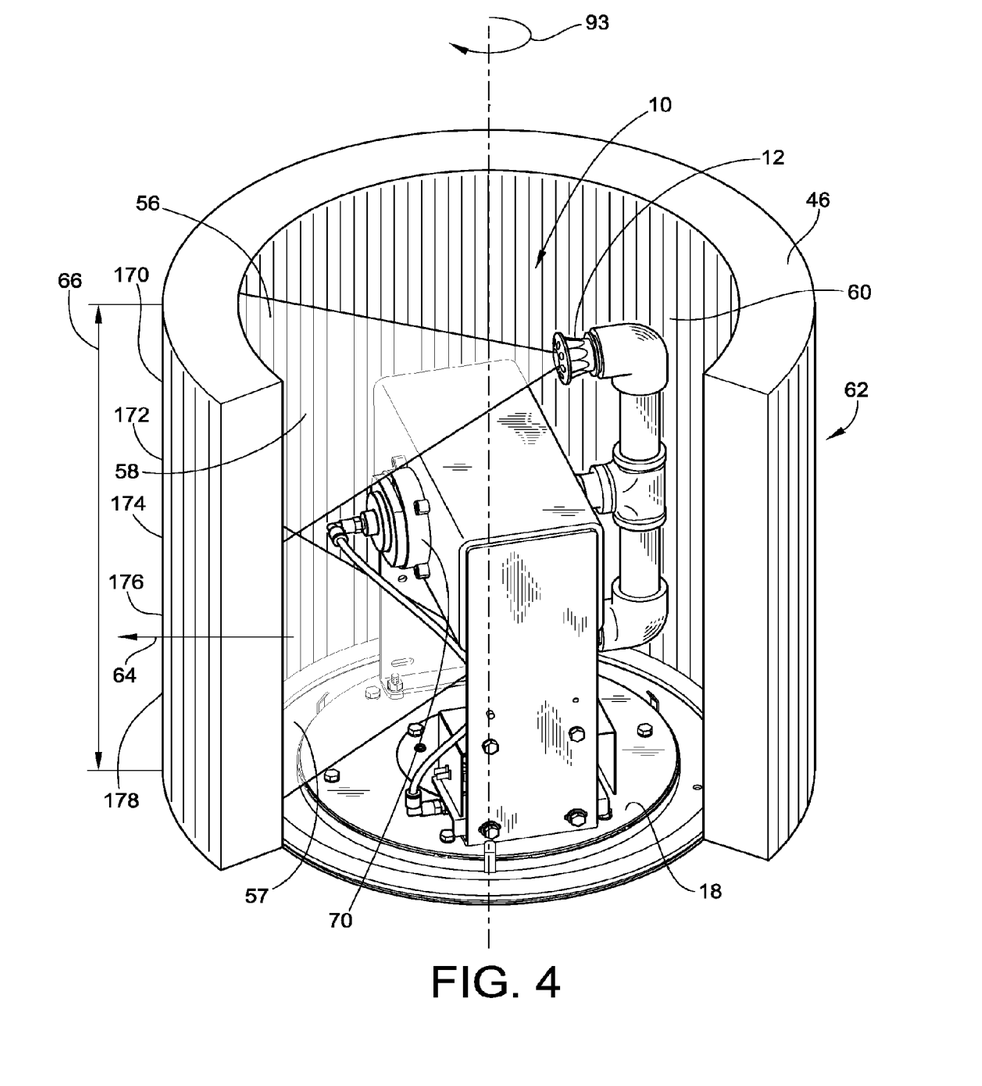
FIG. 4 is an enlarged view of the filter cleaning system in a filter element of the portable air cleaner assembly of FIG. 3 with the filter element partially cut away and depicting a vertical coverage by a set of pulse nozzles.

During the cleaning cycle, the set of pulse nozzles 12, 14 and the compressed air manifold 16, which supplies the compressed air to the pulse nozzles 12, 14, rotate on the turntable 18, wherein the pulse nozzles 12, 14 release pulse blasts at predetermined intervals. FIG. 4 illustrates an enlarged view of the filter cleaning system 10 in the filter element 46 with the filter element 46 partially cut away to show the pulse blasts 56, 57 from the pulse nozzles 12, 14 during the cleaning cycle. The pulse blasts 56, 57 are short burst of high pressure, high velocity air directed toward a target area of an inner surface of a filter media 58 as shown in FIG. 4. The pressurized air blasts from a clean air side 60 to a dirty air side 62 of the dust collection region 36. As the pulse blasts 56, 57 pass through the filter media in a reverse air flow direction 64, a "cake" of dust or other particulate matter falls off from the target area of the filter media 58, which is then collected in the dust collection tray 50, which can be removed and emptied. As a result, the targeted area of the filter media 58, which was hit by the pulse blasts 56, 57, is cleaned, wherein pores of the filter media 58 are reopened for further filtering of a dust laden air stream.

The cleaning system 10 can be configured to have multiple pulses of pulse blasts at timed intervals as the pulse nozzles 12, 14 rotate on the turntable 18 to target different areas of the filter element 46 to maximize a cleaning coverage. In some embodiments, the cleaning cycle may include between 1-100 pulses; preferably between 1-50 pulses; and more preferably between 2-10 pulses. The turntable 18 may have a rotational speed of up to 25 RPM; preferably between 1-10 RPM; and more preferably between 1-5 RPM. The cleaning cycle may have a cycle time between 1-300 seconds; preferably between 1-60 seconds; and more preferably between 20-60 seconds. The pulses of the cleaning cycle may be scheduled to have a same interval or different intervals.

Figure 6:
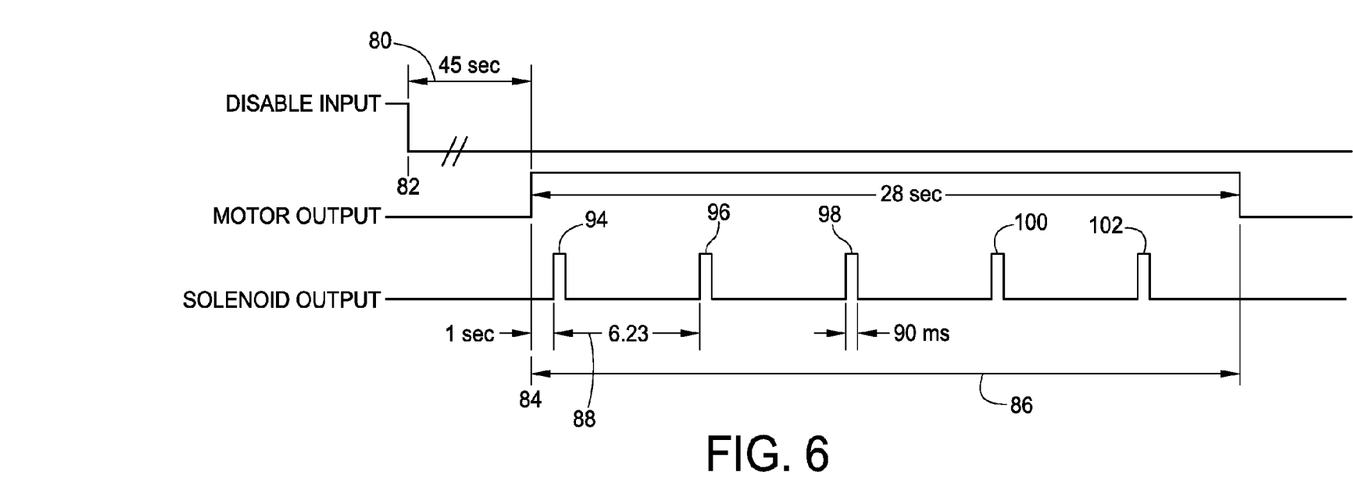
FIG. 6 is a schematic cleaning cycle schedule according to an embodiment of the present invention.

FIG. 6 shows cleaning cycle schematics according to an embodiment of the present invention. In this embodiment, each cleaning cycle 86 includes five pulses 94, 96, 98, 100, 102 with equal intervals 88 between them. In this embodiment, there is a 45 seconds delay 80 from the time the user presses the start button 82 to a start of the cleaning cycle 84. In other embodiments, there may be no delay or a delay shorter than 45 seconds or a delay longer than 45 seconds. The delay 80 allows a time for the blower 40 (FIG. 3) to turn off and stop the air flow through the filter element 46. The turntable 18 begins to rotate at the start of the cleaning cycle 84 at a rotational speed of about 1.9 RPM for a 28 seconds cleaning cycle 86, as shown in a motor output schematic 104. During the cleaning cycle 86, the set of pulse nozzles 12, 14 release five pulses 94, 96, 98, 100, 102 of pulse blasts. As shown in a solenoid output schematic 106, the first pulse 94 starts one second after the start of the cleaning cycle 84. The time interval 88 between the pulses is set at about 6.23 seconds, and a duration of each pulse 90 is set at 90 milliseconds.

Figure 5:
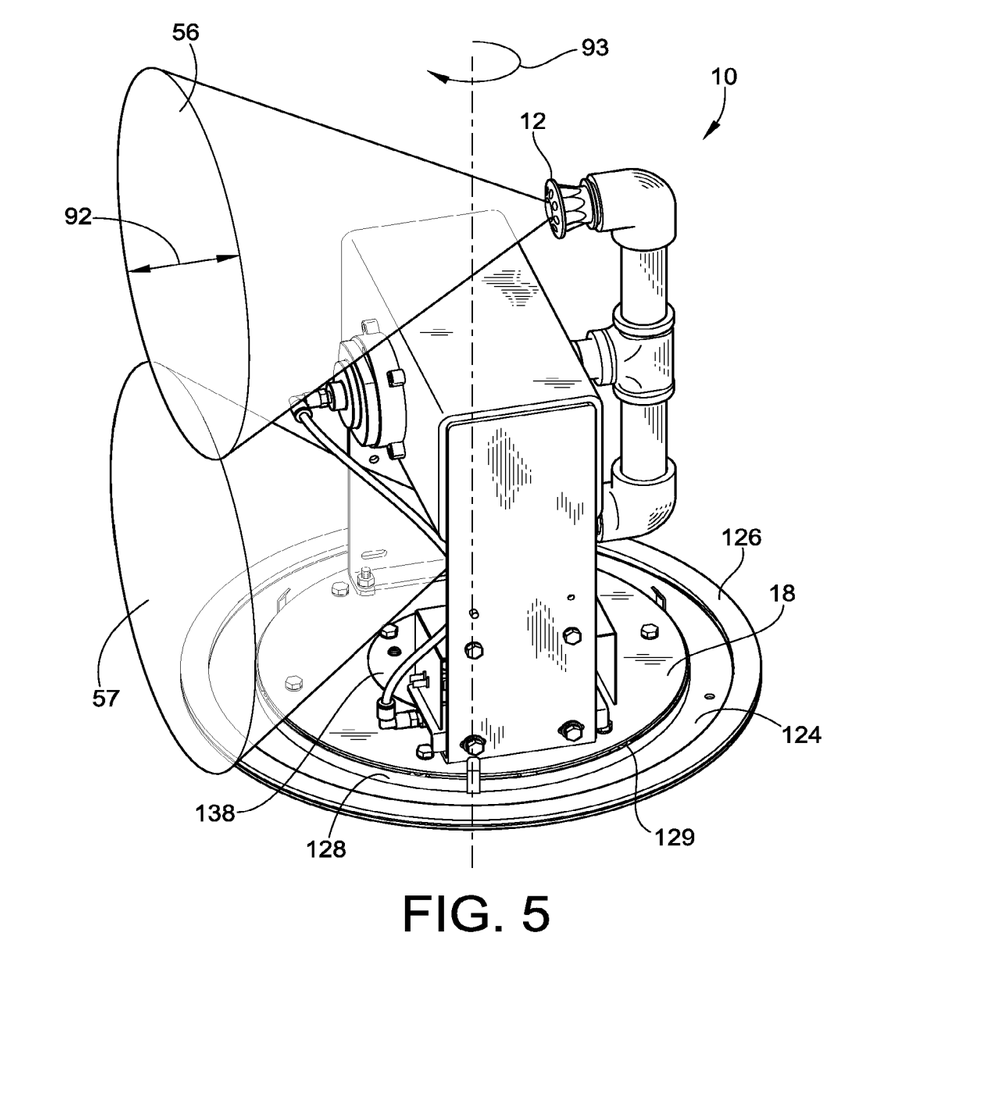
FIG. 5 is a perspective view of filter cleaning system of FIG. 1 showing pulse blasts from a the set of pulse nozzles.
Figure 7:
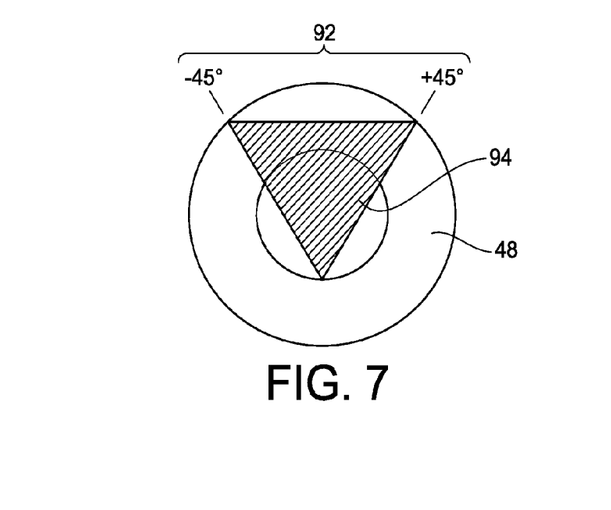
FIG. 7 is a schematic illustration of a horizontal coverage of a pulse according to an embodiment of the present invention.

FIG. 5 shows the filter cleaning system 10 of FIG. 4 without the filter element 46 to better illustrate the pulse blasts 56, 57. As shown, the pulse blasts 56, 57 spreads from the pulse nozzles 12, 14 in a generally conical shape, wherein the pulse blasts 56, 57 partially overlap with each other around a half way between the pulse nozzles 12, 14. FIG. 7 schematically illustrates a maximum horizontal coverage 92 of the pulse blasts of the first pulse 94. As shown, the pulse 94 has the maximum horizontal coverage 92 of about 90°.

Figure 9:
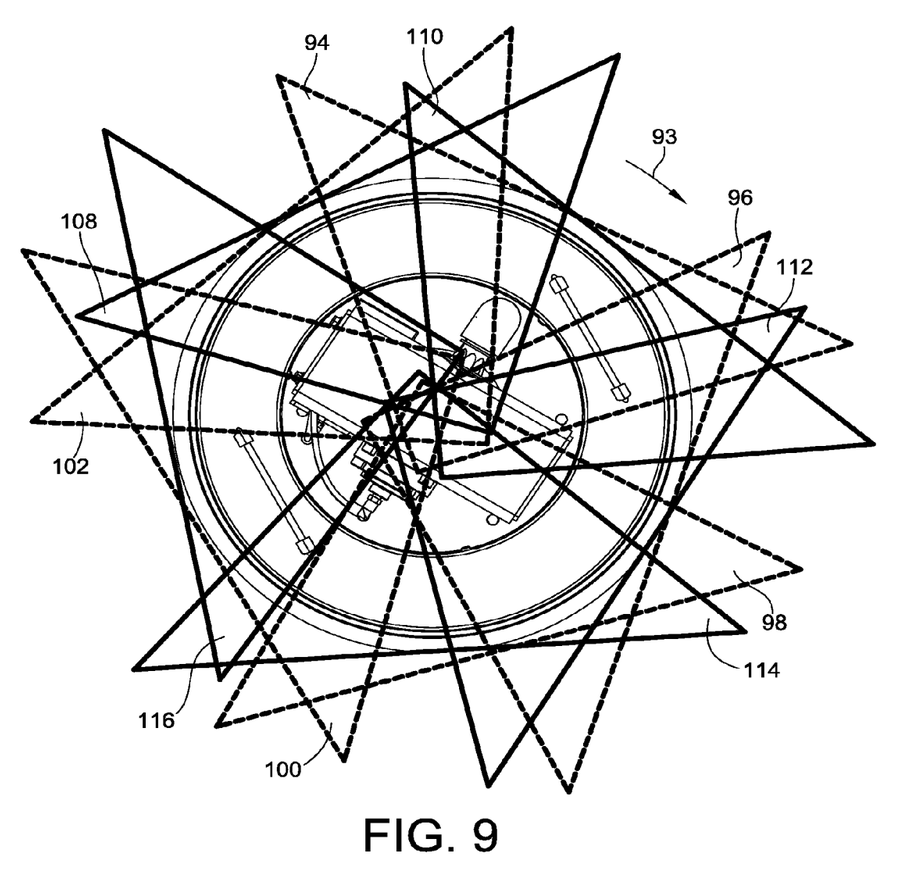
FIG. 9 is a schematic top view of a filter cleaning system in a filter media showing a horizontal coverage of pulse blasts during two cleaning cycles, wherein each cleaning cycle includes five pulses according to an embodiment of the present invention.

FIG. 9 schematically shows pulses from two cleaning cycles according to the cleaning cycle schedule of FIG. 6. As discussed above, one cleaning cycle of this embodiment includes five pulses at equal intervals. In FIG. 9, five pulses from a first cleaning cycle is shown in dashed lines with reference numbers 94, 96, 98, 100, 102, and five pulses from a second cleaning cycle is shown with reference numbers 108, 110, 112, 114, 116. Further, and as discussed above, each of the pulse blasts from the pulse nozzles 12, 14 of each of the five pulses has a maximum horizontal coverage of about 90°. As such, each of the five pulses of a cleaning cycle may overlap horizontally with adjacent pulses to provide more complete cleaning coverage. The maximum horizontal coverage of a pulse blast in other embodiments may be controlled to maximize a cleaning coverage of the filter cleaning system during a cleaning cycle, and thus, may be set to cover less than or greater than 90°.

Now referring to FIGS. 1-6 and 9, the turntable 18 starts to rotate in a clockwise direction 93 at the start of the cleaning cycle 84. Although the turntable 18 in this embodiment is configured to rotate in the clockwise direction, the turntable 18 may be configured to turn in a counterclockwise direction in other embodiments. Thereafter, the pulse nozzles 12, 14 release pulse blasts 56, 57 at a first pulse 94, which is 1 second after the start of the cleaning cycle 84. Then, 6.23 seconds after the start of the first pulse 94, the second pulse 96 is released from the pulse nozzles 12, 14. During this first 6.23 seconds interval, the pulse nozzles 12, 14 on the turntable 18 rotate about 72°, as shown in FIG. 9. The subsequent pulses 98, 100, 102 are released with the same 6.23 seconds interval between them. As such, at the completion of the first cleaning cycle, the five pulses 94, 96, 98, 100, 102, each having the maximum horizontal coverage of about 90°, can substantially cover all inner surface of the filter element 46, As shown in FIG. 6, the cleaning cycle 86 of this embodiment has a cycle duration of 28 seconds at a rotational speed of about 1.9 RPM. As such, the turntable 18 turns less than 360° (about 320°) during the cleaning cycle. This allows the pulses of the subsequent cleaning cycle to target new areas. As shown in FIG. 9, the five pulses 108, 110, 112, 114, 116 of the second cleaning cycle are offset from the five pulses 94, 96, 98, 100, 102 of the first cleaning cycle, thereby targeting the center of the pulse blasts at different areas of filter element 46. Although not shown, each of subsequent cleaning cycles is offset from the previous cycle in a same manner to provide yet different target cleaning areas. Thus, each cleaning cycle is a substantially similar controlled cleaning cycle offset from each other. Such offset pulses of subsequent cleaning cycles can further extend a filter element life by improving the coverage of pulses over multiple cleaning cycles by avoiding repeated pulses being directed at the same location and reducing the possibility of failing to shoot blasts of air at portions of the filter. In other embodiments, pulses of a cleaning cycle can be off set from prior cleaning cycles by arranging the set of pulse nozzles in a predetermined position for a first pulse, for example, by rotating the turntable more than 360° during a cleaning cycle.

The filter cleaning system 10 is also configured for maximum vertical coverage by the pulses of the cleaning cycle. As shown in FIG. 4, the set of air nozzles 12, 14 (nozzle 14 is not shown in FIG. 4, see FIGS. 1-3) is configured and positioned such that the pulse blasts 56, 57 from the set of pulse nozzles 12, 14 cover a whole length 66 of the filter element 46. That is, each of the pulse blasts 56, 57 released from the air nozzles 12, 14 spreads such that a vertical coverage of the pulse blast 56 from the pulse nozzle 12 overlaps with a vertical coverage of the pulse blast 57 from the pulse nozzle 14 to leave no void of the pressurized air along the length 66 of the filter media 58. In this embodiment, the set of pulse nozzles 12, 14 are positioned to release the pulse blasts in an opposite hemisphere from the targeted area to maximize the vertical and horizontal spreads of the pulse blasts 56, 57 (if the pulse nozzles 12, 14 of this embodiment were placed in the same hemisphere as the targeted filter media area, the vertical spreads of the pulse blasts 56, 57 from the pulse nozzles 12, 14 may not cover the whole length 66 of the filter element 46.)

Figure 8:
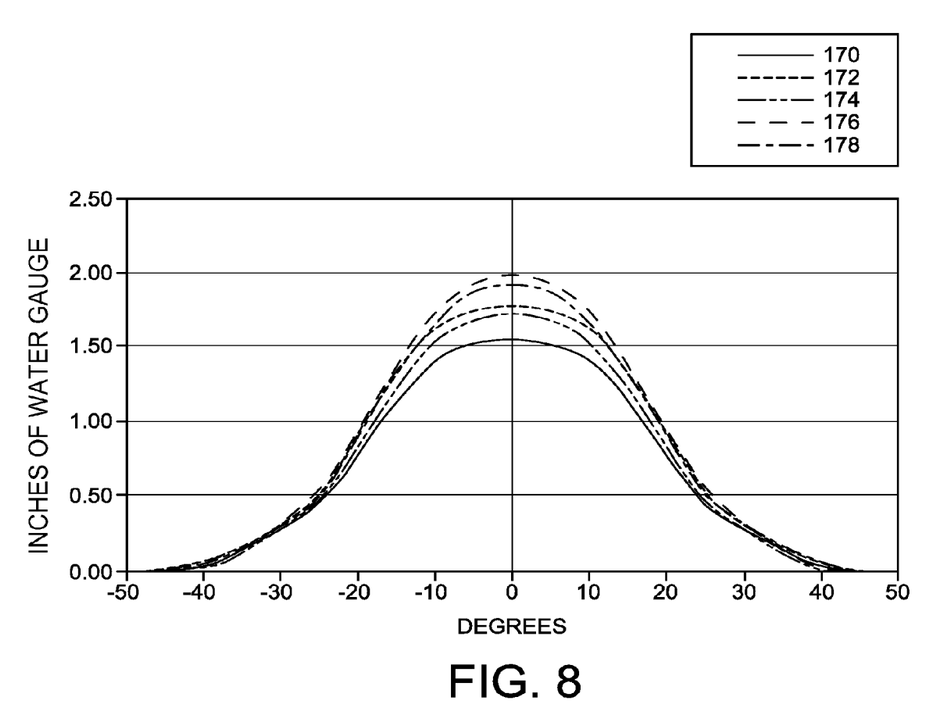
FIG. 8 is a graph of an average positive pressure generated by a pulse blast during a cleaning cycle according to an embodiment of the present invention.

In one embodiment, the filter cleaning system 10 is configured to clean a filter element 46 having a length of about 27 inches. FIG. 8 shows positive air pressures generated by pulse blasts 56, 57 at five different vertical locations along the length 66 of the filter element 46. The pressure measurements were taken at locations 170, 172, 174, 176, 178 as shown in FIG. 4, wherein multiple pressure measurements along the horizontal coverage 92 expanding between −45° and 45° as shown in FIG. 7 were taken at each of the locations 170, 172, 174, 176, 178. As shown in FIG. 8, the pulse blasts 56, 57 generate substantially consistent positive pressures along the length of the filter element 46, wherein the positive pressures generated in the horizontal coverage expanding between −20° and 20° are above 1" w.g. (inches of water gauge).

Figure 13:
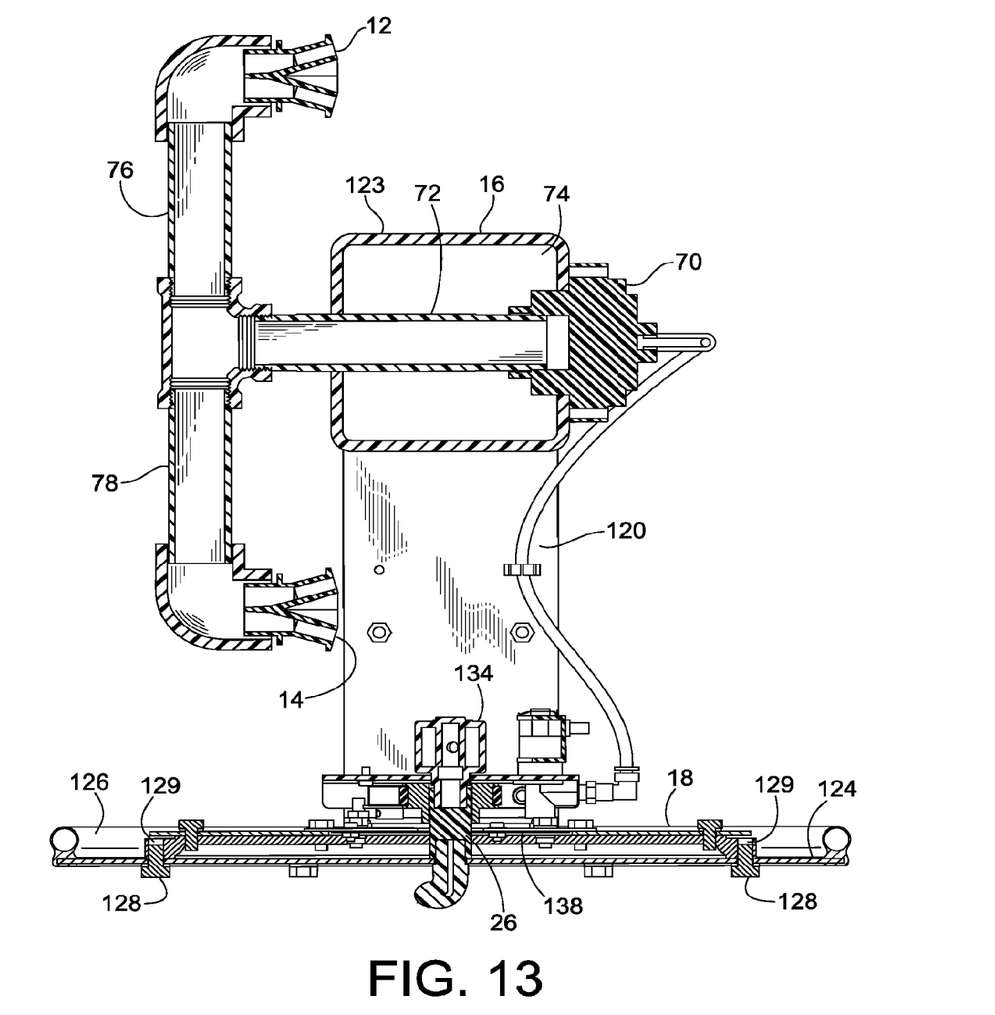
FIG. 13 is a isometric side view of the filter cleaning system of FIG. 1.

Now that the operation of the filter cleaning system 10 has been described generally, components of the filter cleaning system 10 and their arrangements will be explained. Referring back to FIGS. 1-2, the filter cleaning system 10 according to an embodiment of the present invention generally includes the set of pulse nozzles 12, 14, the compressed air manifold 16, and the turntable 18. FIG. 13 illustrates a cross sectional side view of the filter cleaning system 10. The compressed air manifold 16 includes a diaphragm pulse valve 70, a blowpipe 72, and an accumulator 74 for delivering compressed air to the set of pulse nozzles 12, 14. As shown in FIG. 13, the blowpipe 72 is threaded into the diaphragm valve 70 on one end, and attached to pipes 76, 78 leading to the pulse nozzles 12, 14 on the other end. The pipes 76, 78 are rigid pipes to support the pulse nozzles 12, 14 at fixed positions relative to the compressed air manifold 16. As shown, the compressed air manifold 16 is strategically arranged between the pulse nozzles 12, 14, such that the compressed air manifold 16 does not interrupt paths of the pulse blasts released from the pulse nozzles 12, 14, thereby allowing maximum cleaning coverage by the pulse blasts. In this embodiment the pulse nozzles 12, 14 are arranged on a vertical axis perpendicular to a top surface 123 of the compressed air manifold 16. However, the pulse nozzles may be arranged in different angular positions relative to the compressed air manifold in other embodiments. In some embodiments, the pulse nozzles may be configured to rotate relative to the compressed air manifold.

As discussed above, the compressed air manifold 16 rotates with the pulse nozzles 12, 14 during the cleaning cycle, which allows the pulse nozzles 12, 14 and the compressed air manifold 16 to be closely arranged to each other. Such close arrangement between the pulse nozzles 12, 14, and the compressed air manifold 16 can improve efficiency of the compressed air output by reducing resistance when compared to prior cleaning systems including a stationary compressed air manifold, which requires a longer distance between the compressed air manifold and pulse nozzles to allow pulse nozzles to rotate without the compressed air manifold interrupting pulse blast paths.

In one embodiment, the compressed air manifold 16 is configured to include the accumulator 74 having a volume of up to 1 ft$^3$, preferably between 0.05 to 0.5 ft$^3$, and more preferably about 0.126 ft$^3$; an operating pressure of between 40-125 PSI, preferably between 80-100 PSI; and a compressed air usage per pulse of up to 3 SCFM, preferably about 0.83 SCFM. In one embodiment, a cleaning cycle of the filter cleaning system 10 includes five pulses with an equal interval between them, wherein a compressed air usage per pulse is about 0.83 SCFM and a compressed air usage per cycle is about 4.15 SCFM. The pulses of the cleaning cycle are spaced apart at a timed interval to allow sufficient time for the accumulator to refill between pulses or between cleaning cycles.

The compressed air manifold 16 and the set of pulse nozzles 12, 14 are mounted on the turntable 18 via frames 120, 122. The turntable 18 is supported on a base 124 including a filter element seal 126, a turntable support 128, and a center pipe 26. As shown the FIGS. 1, 5 and 13, the turntable 18 is arranged about the center pipe 26, supported on its outer perimeter and configured to rotate against bearings 129 in the turntable support 128. The large radial diameter of the turntable support 128, which supports the outer perimeter of the turntable 18, minimizes recoiling of the filter cleaning system 10 due to high pressure pulse blasts.

The turntable 18 is driven by a drive mechanism 19 including the drive pulley 22, the driven pulley 20, the timing belt 24, and a motor 28. In other embodiment, other suitable drive mechanisms, such as gears, may be used to rotate the turntable 18. The motor 28 is mounted on the frame 120. As shown in FIGS. 1, 2 and 13, the drive pulley 22 is attached to the motor 28 and the driven pulley 20 is mounted on the center pipe 26. The drive mechanism 19 rotates the turntable 18, wherein the set of pulse nozzles 12, 14, and the compressed air manifold 16 are mounted, about the center pipe 26 in a controlled (i.e. not random) manner during a cleaning cycle. The center pipe 26 is also connected to an air supply (not shown) via an elbow 26 located on the bottom of the base 124. The air from the air supply flows through the center pipe 26 and through a tube 132 attached to the center pipe 26 via an adapter 134, and into the compressed air manifold 16. The adapter 134 is sealed to the center pipe 26 and rotates relative thereto.

Figure 10:
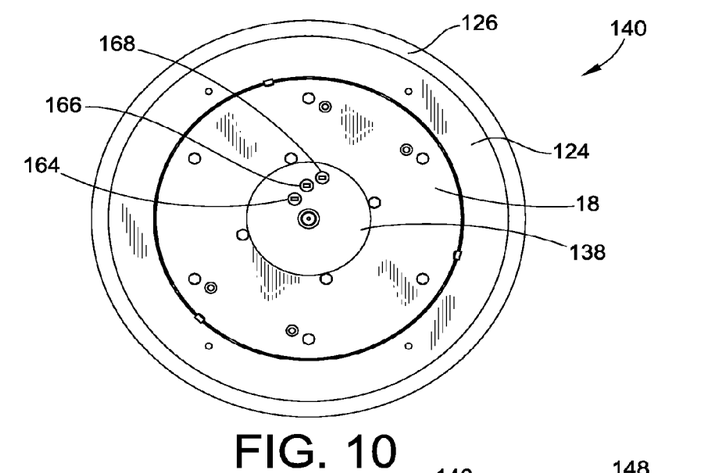
FIG. 10 is a top view of a rotary plate assembly according to an embodiment of the present invention.

FIG. 10 shows a top view of a rotary plate assembly 140 including the turntable 18, the base 124, and a contact plate 138 according to an embodiment of the present invention. As shown, the contact plate 138 is attached to the turntable 18 in the center area, such that the contact plate 138 is arranged between the center pipe 26 and the turntable 18. The center pipe 26 passes through the center hole in the contact plate 138. The contact plate 138 provides power to the motor 28 and a solenoid for the pulse valve 70, which are mounted on the turntable 18, wherein the power transfers along the contact plate 138 and the base plate 142, which are arranged parallel to each other (FIG. 11) to allow the turntable 18 to rotate without any hard electrical wires interrupting a rotational path during cleaning cycles. The base plate 142 is a center portion of the base 124 in this embodiment, but the base plate 142 may be a separate piece independent of base 124 in other embodiments.

Figure 12:
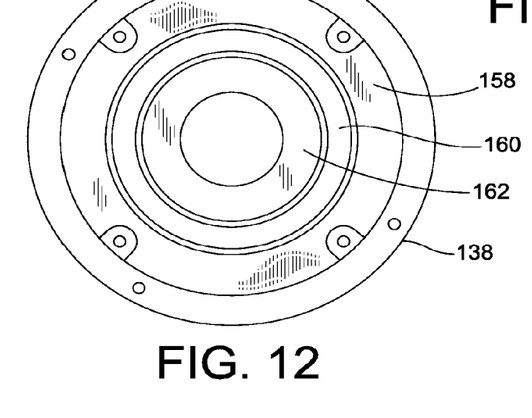
FIG. 12 is a bottom view of the top plate of FIG. 11 showing contact trace rings.

FIG. 12 shows a cross sectional view of the contact plate 138 and the base plate 142. As shown, the base plate 142 includes three brush contacts 146, 148, 150, which are connected to a electrical power supply (not shown) through hard wires 152, 154, 156. Each of the brush contacts 146, 148, 150 are spring loaded to assist contact against the contact plate 138, as the contact plate 138, which is attached to the turntable 18, rotates during a cleaning cycle. FIG. 12 shows a bottom surface of the contact plate 138 showing three contact trace rings 158, 160, 162, which correspond to the brush contacts 146, 148, 150 of the base plate 142. Further, the contact plate 138 includes three contact leads 164, 166, 168 on its top surface (FIG. 10), which correspond to the contact trace rings 158, 160, 162. The contact leads 164, 166, 168 are then hard wired to the motor 28, the solenoid for the pulse valve 70, and any other components mounted on the turntable 18 requiring electricity to provide necessary power. Although, the contact plate and the base plate of this embodiment provide three brush contacts, other embodiments may include one or two contacts, or more than three contacts.

Figure 11:
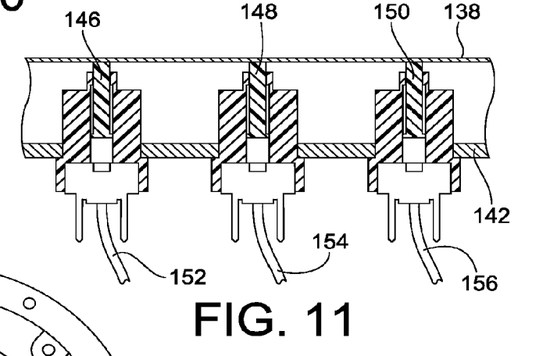
FIG. 11 is a cross sectional view of the rotary plate assembly of FIG. 10 showing brush contacts between a top plate and a bottom plate.

As shown in FIG. 11, the brush contacts are arranged between the contact plate 138 and the base plate 142 within the clean air side 60 of the air cleaner system. Further, the brush contacts are substantially isolated from the rest of the filter cleaning system 10 by being substantially enclosed by the contact plate 138, base plate 142 and the turntable support 128. Further, the contact plate 138 is arranged such that the contact trace rings 158, 160, 162 are facing down. As such, the contacts can remain relatively free of dust, debris and/or moisture, which can bridge contact between the top and bottom plates 142, 144. Thus, such a contact arrangement can ensure power supply to the motor and solenoid, while allowing free rotational movement of the cleaning system assembly by eliminating hard wires for power supply.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter cleaning system for cleaning a tubular filter element defining a central cavity and a central axis, comprising:
   a compressed air supply;
   at least one pulse nozzle operatively attached to the compressed air supply and configured to direct the compressed air;
   a filter element mounting structure, the at least one pulse nozzle being positioned relative to the filter element mounting structure such that an outlet of the at least one pulse nozzle is radially offset from the central axis when a tubular filter element is mounted to the filter element mounting structure; and
   wherein when the tubular filter element is mounted to the filter element mounting structure, the at least one pulse nozzle is arranged in a first semicircle of a cross-section of the tubular filter element, and a target cleaning area of the tubular filter element is in a second, opposite, semicircle of the cross-section of the tubular filter element.

2. The filter cleaning system of claim 1, wherein the at least one pulse nozzle includes a first pulse nozzle and a second pulse nozzle axially offset from one another along an axis that is parallel to the central axis when a filter element is mounted to the filter element mounting structure, wherein the first pulse nozzle is arranged on one side of the compressed air supply, and the second pulse nozzle is arranged on the opposite side of the compressed air supply.

3. The filter cleaning system of claim 2, wherein the first pulse nozzle and the second pulse nozzle are arranged on an axis; wherein the vertical axis extends perpendicularly relative to a horizontal center plane of the compressed air supply.

4. The filter cleaning system of claim 1, wherein the at least one pulse nozzle releases a pulse blast toward a target area of the tubular filter element at predetermined time interval during the cleaning cycle.

5. The filter cleaning system of claim 1, further comprising:
   a rotating plate assembly;
   wherein the compressed air supply and the at least one pulse nozzles are mounted to the rotating plate assembly; and
   wherein the rotating plate assembly rotates during a cleaning cycle.

6. The filter cleaning system of claim 5, wherein the at least one pulse nozzle releases a pulse blast toward a target area of the tubular filter element at predetermined time interval during the cleaning cycle.

7. The filter cleaning system of claim 5, further comprising a drive mechanism, the drive mechanism rotating the rotating plate assembly at a constant rotating speed; and wherein the compressed air supply includes a compressed air manifold and a solenoid pulse valve.

8. The filter cleaning system of claim 5, wherein the compressed air supply and the at least one pulse nozzle rotate together on the rotating plate assembly during the cleaning cycle.

9. The filter cleaning system of claim 5, wherein the at least one pulse nozzle releases multiple pulses of pressurized air during the cleaning cycle, wherein the multiple pulses cover substantially all inner surface.

10. The filter cleaning system of claim 5, further including a control system including a cleaning cycle logic, wherein the control system controls the rotating plate assembly and the compressed air supply during the cleaning cycle according to the cleaning cycle logic; wherein the cleaning cycle logic include a rotational speed of the rotating plate assembly, a cleaning cycle duration, a number of pulses per cleaning logic, and a time interval between pulses.

11. The filter cleaning system of claim 10, wherein the rotational speed is between 1-3 RPM; the cleaning cycle duration is between 10 to 120 seconds; the number of pulses per cleaning logic is between 2 to 20; and the time interval between pulses is 1 to 20 seconds.

12. The filter cleaning system of claim 10, wherein the cleaning cycle is programmed such that the pulses of a subsequent cleaning cycle cover new target areas than target areas of pulses of a previous cleaning cycle.

13. The filter cleaning system of claim 12, wherein the subsequent cycle is identical to the previous cycle but angularly offset therefrom.

14. A filter cleaning system for cleaning a tubular filter element defining a central cavity and a central axis, comprising:
   at least one pulse nozzle operatively attached to the compressed air supply and configured to direct the compressed air;
   a filter element mounting structure, the at least one pulse nozzle being, positioned relative to the filter element mounting structure such that an outlet of the at least one pulse nozzle is radially offset from the central axis when a tubular filter element is mounted to the filter element mounting structure;
   a rotating plate assembly, the compressed air supply and the at least one pulse nozzles being mounted to the rotating, plate assembly, the rotating plate assembly rotating during a cleaning cycle,
   a drive mechanism, the drive mechanism rotating the rotating plate assembly at a constant rotating speed; and wherein the compressed air supply includes a compressed air manifold and a solenoid pulse valve; and
   wherein the rotating plate assembly includes a contact mounting plate assembly providing power to the motor and the solenoid pulse valve; wherein the contact mounting plate assembly includes a contact plate and a base plate, wherein the power transfers between the contact plate and the base plate free of any hard wires.

15. The filter cleaning system of claim 14, wherein the base plate includes at least one brush contact connected to power, and the contact plate includes at least one contact trace ring corresponding to the at least one brush contact, wherein power transfers from the at least one brush contact to the corresponding at least one contact trace ring during rotation of the rotating plate assembly; wherein the motor and the solenoid pulse valve are connected to at least one contact lead on a surface of the contact plate, the at least one contact lead corresponding to the at least one contact trace ring.

16. The filter cleaning system of claim 14, wherein the compressed air supply and the at least one pulse nozzle rotate together on the rotating plate assembly during the cleaning cycle.

17. The filter cleaning system of claim 14, wherein the at least one pulse nozzle releases multiple pulses of pressurized air during the cleaning cycle, wherein the multiple pulses cover substantially all inner surface of the tubular filter element.

18. The filter cleaning system of claim 14, wherein the rotating plate assembly includes a turntable and a turntable support; the turntable support including a plurality of bearings, wherein the turntable support supports the turntable around an outer perimeter of the turntable; wherein the turntable rotates against the turntable support on the plurality of bearings.

19. The filter cleaning system of claim 14, further including a control system including a cleaning cycle logic, wherein the control system controls the rotating plate assembly and the compressed air supply during the cleaning cycle according to the cleaning cycle logic; wherein the cleaning cycle logic include a rotational speed of the rotating plate assembly, a cleaning cycle duration, a number of pulses per cleaning logic, and a time interval between pulses.

20. The filter cleaning system of claim 19, wherein the rotational speed is between 1-3 RPM; the cleaning cycle duration is between 10 to 120 seconds; the number of pulses per cleaning logic is between 2 to 20; and the time interval between pulses is 1 to 20 seconds.

21. The filter cleaning system of claim 19, wherein the cleaning cycle is programmed such that the pulses of a subsequent cleaning cycle cover new target areas than target areas of pulses of a previous cleaning cycle.

22. The filter cleaning system of claim 21, wherein the subsequent cycle is identical to the previous cycle but angularly offset therefrom.

23. A method of cleaning a tubular filter element having a central axis with a filter cleaning system, comprising steps of:
   mounting a tubular filter element to a filter cleaning system, the filter cleaning system comprising:
      a compressed air supply;
      at least one pulse nozzle operatively attached to the compressed air supply and configured to direct the compressed air;
      a filter element mounting structure, the at least one pulse nozzle being positioned relative to the filter element mounting structure such that an outlet of the at least one pulse nozzle is radially offset from the central axis when the tubular filter element is mounted to the filter element mounting structure; and
      the tubular filter element is mounted to the filter element mounting structure with the at least one pulse nozzle arranged in a first semicircle of a cross-section of the tubular filter element, and a target cleaning area of the tubular filter element is in a second, opposite, semicircle of the cross-section of the tubular filter element; and
   releasing at least one pulse of pressurized air from the at least one pulse nozzle during the cleaning cycle at controlled locations.

24. The method of cleaning a filter of claim 23, further including arranging the at least one pulse nozzle from a distance away from a target area of the tubular filter element; wherein the distance is sufficient for the pulse of pressurized air released from the at least one pulse nozzle to cover an entire length of the tubular filter element.

25. The method of cleaning filter of claim 23, further including setting a cleaning cycle, said setting includes setting a cleaning cycle duration; setting a number of pulses to be released during the cleaning cycle; setting a time interval between the pulses.

26. The method of cleaning filter of claim 25, wherein the cleaning cycle duration is set between 20 seconds and 60 seconds; the number of pulses is set between 2 and 10; the time interval is set between 2 seconds and 30 seconds.

27. The method of cleaning filter of claim 23, wherein setting a cleaning cycle includes setting the cleaning cycle to clean substantially all areas of the tubular filter element surrounding the filter cleaning system during one cleaning cycle.

28. The method of cleaning filter of claim 23, wherein setting a cleaning cycle includes setting the cleaning cycle such that a subsequent cleaning cycle targets different areas of the tubular filter element than the areas cleaned during the cleaning cycle.

29. The method of cleaning filter of claim 28, wherein setting a cleaning cycle includes setting the cleaning cycle such that a rotating plate assembly rotates less than 360° during a first cleaning cycle, wherein a second cleaning cycle releases at least one pulse off set from the at least one pulse released during the first cleaning cycle.

30. A method of cleaning a tubular filter element with a filter cleaning system positioned within a central cavity of the tubular filter element, comprising the steps of:
   rotating the filter cleaning system about a central axis of the tubular filter element, the filter cleaning system comprising:
      a compressed air supply;
      at least one pulse nozzle operatively attached to the compressed air supply and configured to direct the compressed air;
      a filter element mounting structure the at least one pulse nozzle being positioned relative to the filter element mounting structure such that an outlet of the at least one pulse nozzle is radially offset from the central axis when the tubular filter element is mounted to the filter element mounting structure; and
   the tubular filter element being mounted to the filter element mounting structure with the at least one pulse nozzle arranged in a first semicircle of a cross-section of the tubular filter element, and a target cleaning area of the tubular filter element is in a second, opposite, semicircle of the cross-section of the tubular filter element;
   releasing a plurality of pulses of pressurized air from the filter cleaning system in an organized sequence of a first cleaning cycle; and
   wherein the pulses of pressurized air travel more than the radial distance from the cleaning system to the inner surface of the tubular filter element, such that the pulses are released from the cleaning system from a first semicircle of the cross-section of the tubular filter element and the pulses contact the tubular filter element in a second, opposite, semicircle of the cross-section of the tubular filter element.

31. The method of claim 30, wherein the organized sequence has the plurality of pulses arranged at constant intervals.

32. The method of claim 31, wherein the constant intervals are time defined.

33. The method of claim 31, wherein the constant intervals are distance travel defined.

34. The method of claim 30, further comprising a second cleaning cycle being substantially identical to the first cleaning cycle except a plurality of pulses of the second cleaning cycle are angularly offset from the plurality of pulses of the first cleaning cycle.

35. The method of claim 34, wherein the cleaning system rotates more than 360 degrees during the first cleaning cycle, such that the second cleaning cycle starts at a different angular position relative to the tubular filter element than the first cleaning cycle.

36. The method of claim 34, wherein the first and second cleaning cycles start at a same angular position but the second cleaning cycle has a period of delay during as the cleaning system is rotating prior to initiating the step of releasing the plurality of pulses for the second cleaning cycle.

37. The method of claim 30, wherein the cleaning system rotates less than 360 degrees during the first cleaning cycle.

38. The method of claim 30, wherein the cleaning system rotates more than 360 degrees during the first cleaning cycle.

39. The method of claim 30, wherein consecutive pulses in a given cleaning cycle partially overlap.

* * * * *

UNITED STATES PATENT AND TRADEMARK OFFICE
CERTIFICATE OF CORRECTION

PATENT NO. : 9,718,018 B2  
APPLICATION NO. : 14/286512  
DATED : August 1, 2017  
INVENTOR(S) : Travis Haynam et al.

It is certified that error appears in the above-identified patent and that said Letters Patent is hereby corrected as shown below:

In the Claims

Column 10, Claim 14, Line 20-21, reads "comprising: at least one pulse nozzle operatively attached to the" and should read --comprising: a compressed air supply; at least one pulse nozzle operatively attached to the--

Column 10, Claim 14, Line 25, reads "nozzle being, positioned relative to the filter element" and should read --nozzle being positioned relative to the filter element--

Column 10, Claim 14, Line 32, reads "rotating, plate assembly, the rotating plate assembly" and should read --rotating plate assembly, the rotating plate assembly--

Column 12, Claim 30, Line 25, reads "a filter element mounting structure the at least one pulse" and should read --a filter element mounting structure, the at least one pulse--

Signed and Sealed this  
Twenty-fourth Day of October, 2017

Joseph Matal  
*Performing the Functions and Duties of the*  
*Under Secretary of Commerce for Intellectual Property and*  
*Director of the United States Patent and Trademark Office*